United States Patent [19]

Mueller, Jr.

[11] 4,168,721
[45] Sep. 25, 1979

[54] PRESSURE CONTROL VALVE

[75] Inventor: Otto Mueller, Jr., Detroit, Mich.

[73] Assignee: Massey-Ferguson Inc., Detroit, Mich.

[21] Appl. No.: 807,265

[22] Filed: Jun. 16, 1977

[51] Int. Cl.² ............................................. F16K 15/06
[52] U.S. Cl. ................................. 137/514.7; 137/538
[58] Field of Search ............... 137/514.3, 514.5, 514.7, 137/538

[56] References Cited

U.S. PATENT DOCUMENTS

| | | | |
|---|---|---|---|
| 1,494,135 | 5/1924 | Robison . | |
| 2,323,021 | 6/1943 | Ernst | 137/475 |
| 2,506,162 | 5/1950 | Metzgar | 137/514.7 |
| 2,993,505 | 7/1961 | Towler | 137/514.7 X |
| 3,029,834 | 4/1962 | Vanden Hoek | 137/514.5 |
| 3,086,551 | 4/1963 | Gordon | 137/514.5 |
| 3,103,230 | 9/1963 | Kutsche | 137/514.5 X |
| 3,547,559 | 12/1977 | Tittmann . | |

FOREIGN PATENT DOCUMENTS

| | | | |
|---|---|---|---|
| 1773301 | 7/1971 | Fed. Rep. of Germany . | |
| 2333191 | 6/1977 | France . | |
| 46-28944 | 8/1971 | Japan | 137/514.5 |
| 1102421 | 2/1968 | United Kingdom . | |

*Primary Examiner*—Robert G. Nilson
*Attorney, Agent, or Firm*—John C. Thompson

[57] ABSTRACT

An improved pressure control valve which provides equal damping force in both directions of movement of the valve spool and which also provides negative feedback to partially negate fast transients leading to valve instability. The pressure control valve includes a valve body having an inlet chamber and an enlarged adjacent damping chamber. A valve spool is received within the chambers, the spool having a first portion and a second radially outwardly extending portion adjacent the first portion and disposed within the damping chamber. As the valve spool is shifted to an open position fluid will be expelled from the damping chamber through a first orifice, and as the valve spool returns towards its closed position fluid will be expelled through a second orifice, the orifices having cross-sectional areas proportionate to the volume of fluid being expelled so that equal damping will be obtained in either direction of movement of the valve spool. The valve spool is provided with an orifice passageway which permits fluid in the inlet chamber to be in communication with fluid in the damping chamber whereby transient peaks in the inlet may be transmitted to the damping chamber to provide for negative feedback.

9 Claims, 2 Drawing Figures

PRESSURE CONTROL VALVE

TECHNICAL FIELD

The present invention relates generally to pressure control valves and more particularly to a pressure control valve having a relatively rapid response and increased stability.

BACKGROUND

Many prior art pressure control valves have been designed, and one form of prior art pressure control valve includes a spool member shiftable within the bore of a valve body against spring pressure from a normally closed position to an open position. The advantage of this form of pressure control valve is its relative ease of manufacture and reliability of operation. However, this form of pressure control valve has inherent disadvantages in that as the response rate increases so does its instability. Thus, in the basic design referred to above if the valve spool responds rapidly it will tend to overshoot its desired nominal design operating position leading to valve instability or chatter. It has been proposed in the past to damp the movement of the valve spool to improve stability. However, this customarily has the disadvantage of reducing the responsiveness of the valve. Furthermore, the damping is generally at varying rates wherein as the valve spool moves in one direction it is damped at one rate, and when it moves in the other direction it is damped at an entirely different rate. In addition, prior art valves which tend to be responsive are also frequently affected by transient peaks in the input pressure, and valve spools are especially prone to chatter in systems where they are regulating the output pressure of a pump where the pump ripples are near or at the natural frequency of the spring mass system of the spool and regulating spring.

SUMMARY OF THE INVENTION

It is an object of this invention to overcome the disadvantages of the prior art constructions referred to above by providing a responsive pressure control valve of greater stability.

More specifically, it is an object of the present invention to provide a pressure control valve of the type having a spool shiftable within a valve body wherein equal damping of force is applied in both directions of movement of the valve spool.

It is a further object of the present invention to provide negative feedback means which are operable to partially negate transient peaks leading to valve instability in a pressure control valve of the type having a spool shiftable within a valve body.

These and other objects and advantages of the present invention are accomplished by providing a valve body having an inlet chamber and a coaxial adjacent damping chamber which is provided with axially spaced apart orifices of differing cross-sectional areas, a valve spool moveable within the chambers, the valve spool having a first portion and an enlarged second portion disposed within the damping chamber between the axially spaced apart orifices, and the valve spool further being provided with an axially extending orifice passageway to place the inlet chamber in communication with the damping chamber.

These and other objects and features will be apparent to those skilled in the art after a consideration of the following detailed description taken in conjunction with the accompanying drawings in which a preferred form of this invention is shown.

DETAILED DESCRIPTION

Figure 1:
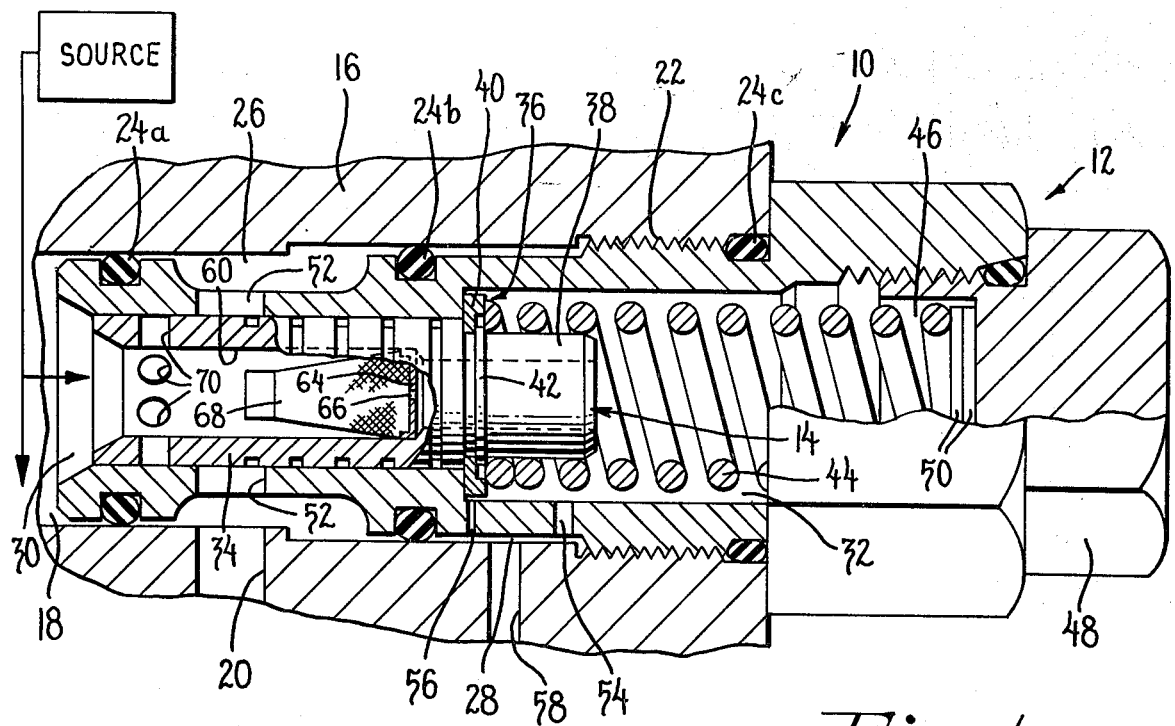
FIG. 1 has a longitudinal section of the pressure control valve constructed in accordance with the principles of the present invention, the valve spool being shown in its normally closed position.

Referring now to the drawings, there is shown a normally closed pressure control valve, indicated generally at 10, the pressure control valve including a valve body, indicated generally at 12, and a spool indicated generally at 14. In the embodiment illustrated the valve 10 is capable of regulating the pressure of a system to a predetermined value, and the valve is mounted within a suitable housing 16 of a vehicle. The housing is provided with an inlet line 18 in communication with a source of hydraulic fluid under pressure, such as a pump, and an outlet 20. The housing 16 has a cylindrical bore provided with threads 22 which receives a threaded portion of the valve body 12. O-rings 24 are disposed within suitable annular recesses on the valve body and are adapted to cooperate with the bore of the housing 16 to form annular recesses 26,28, the annular recess 26 being between O-rings 24a and 24b, and the recess 28 being between O-rings 24b and 24c.

The valve body 12 is provided with an inlet chamber 30 and a damping chamber 32. The valve spool 14 includes a first portion 34 disposed entirely within the inlet chamber 30 when the valve spool is in its normally closed position illustrated in FIG. 1 and a second radially outwardly extending portion indicated generally at 36, the second radially outwardly extending portion being disposed at all times within the damping chamber 32, and being of a diameter slightly less than the diameter of the chamber 32.

The spool is provided with a third portion or pilot 38 of a diameter less than that of the first portion. The second radially outwardly extending portion consists of a right cylindrical ring 40 which is slipped over the pilot portion 38 until it abuts against one end of the first portion, the ring 40 being held in place by a snap ring 42 which is received within a suitable groove (not shown) on the pilot portion 38. Biasing means in the form of a spring 44 is disposed within the damping chamber, the spring acting upon one face of the ring 40 to normally bias the spool to its normally closed position. The other end of the spring 44 is received within a recess 46 of a threaded plug 48, which plug is employed to close one end of the damping chamber 32. Shims 50 may be disposed between the end of the spring and the bottom of the recess 46 in the plug 48 to properly compress the spring 44.

The valve body is provided with a plurality of transversely extending outlet passageways 52 which extend between the inlet chamber 30 and the annular recess 26. That portion of the inlet chamber on the upstream side (to the left in FIG. 1) can be considered to be an inlet passageway. In addition, the valve body is provided with axially spaced apart first and second orifices 54 and 56, respectively. The orifices 54 and 56 will place the damping chamber 32 in communication with the annular recess 28 which is in turn connected with the sump or reservoir through a further port 58 in the housing 16. The second orifice 56 disposed at one end of the damping chamber, and the first outlet orifice 54 is disposed between the ends of the damping chamber at a location beyond the normal range of movement of the ring 40 within the damping chamber.

The valve spool 14 is provided with adjacent first and second axially extending bores 60, 62 respectively, the first bore 60 being of a larger diameter than the second bore 62. A plug 64 is press fitted in the first bore until it bottoms out, the plug 64 being provided with an orifice 66. A screen 68 is mounted within the first bore 60 (preferably by an adhesive) and serves to prevent small particles which may be carried by the hydraulic fluid from obstructing the passage of fluid through the orifice 66. The spool is provided with further transversely extending bores or passageways 70 which serve to place the first bore 60 of the spool in communication with the outlet passageways 52.

Figure 2:
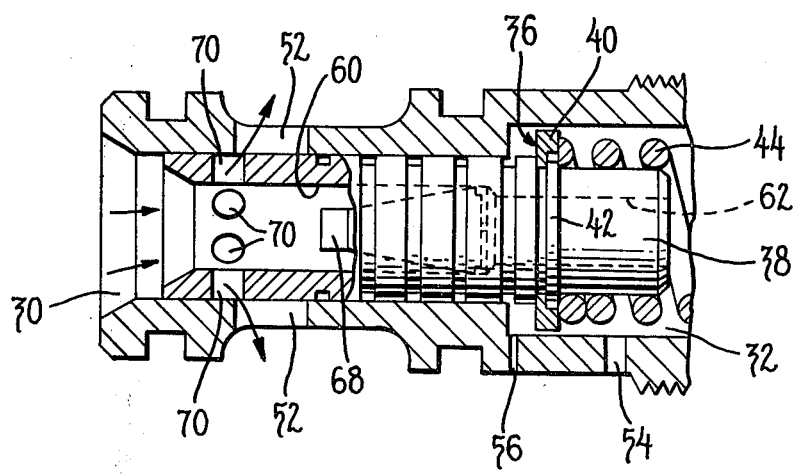
FIG. 2 is a partial sectional view corresponding to FIG. 1 showing the valve spool in its nominal design operating position.

In operation the valve is preferably located within the hydraulic fluid reservoir. In the normally closed position the parts will be in the position shown in FIG. 1. When the pressure of the fluid within the inlet chamber 30 attains the design operating pressure the valve spool will be shifted to the right to a position approximating that shown in FIG. 2 wherein fluid may flow through the inlet passageway of the inlet chamber 30, the first bore 60, the transverse passageways 70, the outlet passageways 52, annular recess 26 and outlet 20 to reservoir. When the pressure within the chamber 30 falls below the design operating pressure the spool will be shifted back to its closed position shown in FIG. 1. At low rates of movement of the spool 14 damping will be provided by the annular orifice between the ring 40 and the chamber 32, excess hydraulic fluid being displaced from the chamber 32 through orifice 54 as the spool moves to the right, and makeup fluid being supplied to the chamber 32 through orifice 66 as the spool moves to the left. In order to achieve increased stability at high rates of spool movement the orifices 56 and 54 are provided. Thus, as the valve spool moves to the right at a high rate fluid will be discharged through the first orifice 54 to dampen the movement of the spool in this direction and similarly, as the spool moves at a high rate to the left fluid will be discharged through the second orifice 56. The cross-sectional areas of the orifices 54 and 56 are designed to be proportionate to the volume of the fluid being displaced at high rates of spool movement. In this respect, the radially outwardly extending portion 36 or 40 and the pilot portion 38 can be thought of as a piston and the first portion 34 can be thought of as a piston rod. It should be appreciated that the volume of oil being displaced as the spool moves rapidly one unit to the right is proportionate to the cross-sectional area of the piston. Similarly, as the spool moves rapidly one unit to the left the volume of oil being displaced is proportionate to the cross-sectional area of the piston (or damping chamber) less the cross-sectional area of the piston rod (or first portion of the spool). It has been found that by sizing the cross-sectional areas of the orifices to have proportionate relationships that uniform damping can be achieved in either direction of movement of the spool. While the orifices 54, 56 help the valve spool achieve stability based upon demands placed upon the system, it should be appreciated that there will be transient peaks imposed upon the system by the source of fluid under pressure. In order to further increase the stability of the valve spool an orifice passageway (the first and second bores 60, 62 and orifice 66) is provided within the valve spool to place the inlet chamber in communication with the damping chamber. This passageway provides negative feedback to partially negate fast transients leading to valve instability, especially at critical rpm's of the pump source where pump ripples are near or at the natural frequency of the spring mass system of the spool and regulating springs. In order to insure the proper operation the orifice 66 should be of a size less than the smaller of the two orifices 54, 56.

The passageway 60, 62, 66 cooperates with the damping provided by the orifices 54, 56 by insuring that the damping chamber is maintained full of hydraulic fluid and furthermore by expelling any air which may be trapped within the damping chamber or associated orifices.

While a preferred structure in which the principles of the present invention have been incorporated as shown and described above, it is to be understood that the invention is not to be limited to the particular details shown and described above, but that, in fact, widely differing means may be employed in the practice of the broader aspects of the invention.

I claim:

1. A normally closed pressure control valve comprising:
   a valve body provided with inlet and damping chambers, said inlet chamber having inlet and outlet passageways, and said damping chamber having axially spaced apart first and second orifices;
   a valve spool shiftable within the valve body between a normally closed position and an open position, said valve spool having a first portion disposed entirely within the inlet chamber when the spool is in its normally closed position and a second radially outwardly extending portion disposed in the damping chamber; and
   biasing means operable to normally bias the valve spool to its closed position;
   the parts being so arranged and dimensioned that as the valve spool shifts from a closed position to an open position fluid within the damping chamber will be discharged through the first orifice to damp the movement of the valve spool, as the valve spool is disposed in an open position the second radially outwardly extending portion of the valve spool is disposed between the axially spaced apart first and second orifices, and as the valve spool shifts from an open position to a closed position fluid within the damping chamber between the second portion of the valve spool and the inlet chamber will be discharged through the second orifice to damp the movement of the valve spool.

2. The normally closed pressure control valve as set forth in claim 1 wherein the inlet and damping chambers are coaxial and adjacent, the inlet chamber being of a diameter less than that of the damping chamber.

3. The normally closed pressure control valve as set forth in claim 2 wherein the second radially outwardly extending portion of the valve spool is a right cylindrical member disposed immediately adjacent the first portion of the valve spool and, when the valve spool is in its normally closed position, disposed with one side adjacent one end of the damping chamber.

4. The normally closed pressure control valve as set forth in claim 3 wherein the first orifice is larger than the second orifice.

5. The normally closed pressure control valve as set forth in claim 3 wherein said second portion is a ring disposed about a third portion of the valve spool, the third portion being of a diameter less than the first portion of the valve spool, one end of the ring abutting one end of the first portion, and the other end of the ring being held in place by a snap ring.

6. The normally closed pressure control valve as set forth in claim 2 wherein the valve spool is provided with an orifice passageway extending from one end to the other end of the valve spool.

7. The normally closed pressure control valve as set forth in claim 2 wherein the valve spool is provided with first and second interconnected axially extending bores the first bore being of a diameter greater than the second bore, and wherein the valve spool is further provided with transversely extending passageways extending between the first bore and the outer surface of the valve spool, said transversely extending passageways being adapted to be placed in communication with the outlet passageway when the normally closed pressure control valve is in its nominal design operating position, and further characterized by the provision of a plug press fitted into the first bore, said plug being provided with an orifice passageway to place fluid within the first bore in communication with fluid within the second bore.

8. The normally closed pressure control valve as set forth in claim 7 further characterized by the provision of screen means disposed within the first bore and operable to screen material from said orifice passageway and the press fitted plug.

9. The normally closed pressure control valve as set forth in claim 2 wherein the first orifice is of the greater cross-sectional area than the second orifice, and further characterized by the provision of passageway means extending through the valve spool to place the inlet chamber in fluid communication with the damping chamber said passageway through the valve spool including an orifice having a cross-sectional area less than the cross-sectional area of the first orifice in the valve body.

* * * * *